(12) United States Patent
Esterholt et al.

(10) Patent No.: US 10,606,151 B1
(45) Date of Patent: Mar. 31, 2020

(54) COVER FOR REAR-MOUNTED VEHICLE CAMERA

(71) Applicants: Brian Esterholt, Pinedale, WY (US); Charlotte Esterholt, Pinedale, WY (US)

(72) Inventors: Brian Esterholt, Pinedale, WY (US); Charlotte Esterholt, Pinedale, WY (US)

( * ) Notice: Subject to any disclaimer, the term of this patent is extended or adjusted under 35 U.S.C. 154(b) by 0 days.

(21) Appl. No.: 16/267,496

(22) Filed: Feb. 5, 2019

(51) Int. Cl.
| | |
|---|---|
| *G03B 17/08* | (2006.01) |
| *G03B 17/42* | (2006.01) |
| *B60R 11/04* | (2006.01) |
| *H04N 5/225* | (2006.01) |
| *G03B 17/56* | (2006.01) |

(52) U.S. Cl.
CPC .............. *G03B 17/08* (2013.01); *B60R 11/04* (2013.01); *G03B 17/425* (2013.01); *G03B 17/56* (2013.01); *H04N 5/2252* (2013.01); *B60R 2300/8066* (2013.01)

(58) Field of Classification Search
CPC .... G03B 17/08; G03B 17/425; G03B 17/568; B60R 11/04; H04N 5/2252
See application file for complete search history.

(56) References Cited

U.S. PATENT DOCUMENTS

| | | | |
|---|---|---|---|
| 7,813,639 | B2 | 10/2010 | Yoneji |
| 9,291,879 | B2 | 3/2016 | Samardzic et al. |
| 9,298,065 | B1 | 3/2016 | Samardzic et al. |
| 9,442,350 | B2 | 9/2016 | Samardzic et al. |
| 9,444,984 | B2 | 9/2016 | Scudder et al. |
| 9,531,924 | B2 | 12/2016 | Scudder et al. |
| 9,584,706 | B2 | 2/2017 | Scudder et al. |
| 9,744,914 | B2 | 8/2017 | Barthel et al. |
| 9,866,736 | B2 | 1/2018 | Schutz et al. |
| 9,955,052 | B2 | 4/2018 | Buss |
| 2017/0036600 | A1* | 2/2017 | Whitehead ................ B60R 1/00 |

* cited by examiner

*Primary Examiner* — Nicholas G Giles
(74) *Attorney, Agent, or Firm* — Cramer Patent & Design, PLLC; Aaron R. Cramer

(57) ABSTRACT

A camera protection device, a protected camera and a vehicle having a protected camera, all include a weatherproof housing having a lower portion for holding a camera and an upper portion, a movable protective domed cover, and a mechanism for selectively moving the domed cover in front of the lower portion in a closed position or above the lower portion in an open position. The mechanism includes a motor that is operatively connected to the domed cover. A cleaning brush vertically wipes across the lower portion when the mechanism moves the domed cover. A seal seals between the domed cover and the lower portion when the domed portion is in front of the lower portion in a closed position. The mechanism includes a cable, a pivot for pivoting the domed cover, and a linkage connecting the motor to the domed cover. A belt operatively connects the motor to the linkage.

14 Claims, 5 Drawing Sheets

COVER FOR REAR-MOUNTED VEHICLE CAMERA

FIELD OF THE INVENTION

The presently disclosed subject matter is directed to vehicle safety. More particularly the present invention relates to movable protective covers for vehicle rear-view cameras.

BACKGROUND OF THE INVENTION

A popular option on late model motor vehicles is the rear-view camera. Rear-view cameras provide drivers with a view of areas behind their vehicles that rear-view mirrors cannot provide. Highly useful when backing up and parking, rear-view cameras are also safety features that help prevent accidents.

While popular and useful, rear-view cameras suffer from major disadvantages that can become readily apparent to those who use them. It only takes a small amount of road grit, dust, salt, insects, snow, and the like to render them almost or totally useless. Such contamination can occur during or after inclement weather or while experiencing dirty conditions.

Rear-view camera contamination can force users to either forgo the enhanced visual aid that comes from their use or to stop their vehicles to remove the offending materials. Contamination can become a never-ending battle while driving under conditions in which dirt, salt, dust, sleet and snow are experienced. A rear-view camera can become excessively blocked in a remarkably short time.

In the prior art some manufacturers provided washer systems that clean rear-view cameras. While useful, such washer systems take time to operate, can smear camera views and in general are not instantly available when a clear rearward view is needed.

Accordingly, there exists a need to protect motor vehicle rear-view cameras from contaminants such that unobstructed views can be made available on a moment's notice. Preferably such unobstructed views would be provided in a manner suitable for being implemented at low cost and in configurations that can be rapidly installed and easy to use. Ideally, such unobstructed views would be provided without limiting the camera view and without impeding access to the rear of the motor vehicle.

SUMMARY OF THE INVENTION

The principles of the present invention provide for protective devices for rear-view cameras, for rear-view cameras that incorporate such protection, and for motor vehicles having protected rear-view cameras. When using the subject invention unobstructed views can be made available on a moment's notice without limiting the camera view and without impeding access to the rear of the motor vehicle. The protective features are suitable for being implemented at low cost and in configurations that can be rapidly installed and easy to use.

A camera protection device in accord with the present invention includes a weatherproof housing having a lower portion for holding a camera and an upper portion, a movable protective domed cover, and a mechanism for selectively moving the domed cover in front of the lower portion or above the lower portion.

Beneficially the mechanism includes a motor that is operatively connected to the domed cover. Also, beneficially the camera protection device further includes a cleaning brush that vertically wipes across the lower portion when the mechanism moves the domed cover. Preferably, there is a seal for sealing between the domed cover and lower portion when the domed portion is in front of the lower portion in a closed position. The mechanism can further include a cable, a pivot for pivoting the domed cover, and a linkage connecting the motor to the domed cover. There may be a belt operatively connecting the motor to the linkage. Preferably, the mechanism is located inside the upper portion.

A camera that is in accord with the present invention includes a weatherproof housing having a lower portion and an upper portion, a camera body located in the lower portion, a movable protective domed cover, and a mechanism for selectively moving the domed cover in front of the camera body or over the camera body.

Beneficially, the mechanism includes a motor that is operatively connected to the domed cover. Also beneficially the camera further includes a cleaning brush that vertically wipes across the camera lens when the mechanism moves the domed cover. Preferably, there is a seal for sealing between the domed cover and lower portion when the domed portion is in front of the camera body in a closed position. The mechanism can further include a cable, a pivot for pivoting the domed cover, and a linkage connecting the motor to the domed cover. There may be a belt operatively connecting the motor to the linkage. Preferably, the mechanism is located inside the upper portion.

A motor vehicle that is in accord with the present invention includes a rear vehicle portion, a weatherproof housing attached to the rear vehicle portion, wherein the weather proof housing includes a lower portion and an upper portion, a camera body in the lower portion, a movable protective domed cover; and a mechanism for selectively moving the domed cover in front of the camera body in a closed position or above the camera body in an open position.

Beneficially the mechanism includes a motor that is operatively connected to the domed cover. Also, beneficially the mechanism includes a cleaning brush that vertically wipes across the camera lens when the mechanism moves the domed cover. Preferably, there is a seal for sealing between the domed cover and the lower portion when the domed portion is in front of the camera body in a closed position. The mechanism can further include a cable, a pivot for pivoting the domed cover, and a linkage connecting the motor to the domed cover. There may be a belt operatively connecting the motor to the linkage. Preferably, the mechanism is located inside the upper portion.

BRIEF DESCRIPTION OF THE DRAWINGS

The advantages and features of the present invention will become better understood with reference to the following detailed description and claims when taken in conjunction with the accompanying drawings in which:

Figure 1:
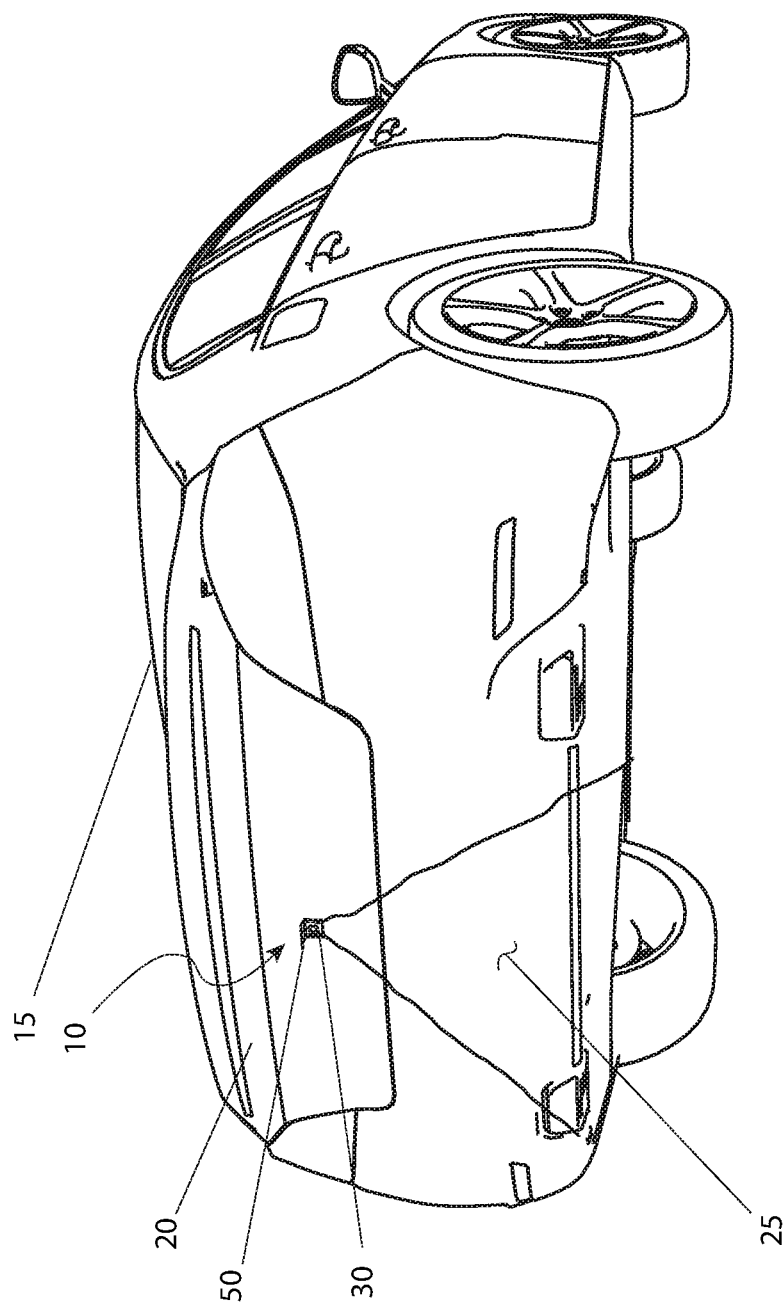
FIG. 1 is a perspective view of a retractable weather shield 10 that is in accord with the present invention and which is installed on a motor vehicle 15.

DESCRIPTIVE KEY 10 retractable weather shield
15 motor vehicle
20 rear facing surface
25 field of view
30 rear-view camera
35 license plate trim ring
40 lower portion
45 weatherproof housing
50 movable domed cover
55 upper portion
60 weatherproof gasket
65 cleaning brush
70 brush travel path "b"
75 guide track
80 cable
85 reel
90 upper brush position
95 lower brush position
100 hinge point
105 rotational travel path "r"
110 electric motor
115 hinge linkage mechanism
120 raised linkage position
125 lowered linkage position
130 connecting drive belt
135 12 VDC supply
140 camera video signal connection
145 motor control circuit
150 splice point

DESCRIPTION OF THE INVENTION

The preferred embodiment of the present invention is depicted in FIGS. 1 through 5. However, the invention is not limited to the specifically described embodiment. A person skilled in the art will appreciate that many other embodiments of the invention are possible without deviating from the basic concept of the invention, and that any such work around will fall within the scope of this invention.

In the figures like numbers refer to like elements throughout. Additionally, the terms "a" and "an" as used herein do not denote a limitation of quantity, but rather denote the presence of at least one of the referenced items.

Refer now to FIG. 1 for a front view of a retractable weather shield 10 that is in accord with the preferred embodiment of the present invention. The retractable weather shield 10 is mounted on a rear surface 20 of a motor vehicle 15, such as on a trim area, a bumper area, a license plate trim ring (as shown on FIG. 2), an access handle, or the like. It is envisioned that the retractable weather shield 10 might be provided as original equipment manufacturer (OEM) equipment or made available as an aftermarket add-on for installation by the user or some third party.

For purposes of illustration the motor vehicle 15 is depicted as a sport utility vehicle (SUV). However, it is to be understood that other types of motor vehicle 15 including; but not limited to: sedans, pickup trucks, vans, semi's, and the like could also benefit from the teachings of the present invention. As such the use of the retractable weather shield 10 on any particular style, make, or model of motor vehicle 15 is not intended to be a limiting factor of the present invention.

Still referring to FIG. 1, the rear-view camera 30 is located on the rear of the motor vehicle 15 so as to have a field of view 25 suitable for the intended purpose of the rear-view camera 30. It is envisioned that the retractable weather shield 10 can be an integral component of the rear-view camera 30 itself, it can be a separate component that is positioned over an existing rear-view camera 30, it can be a housing for a rear-view camera 30, or it can be an integral part of the motor vehicle 15.

Figure 2:
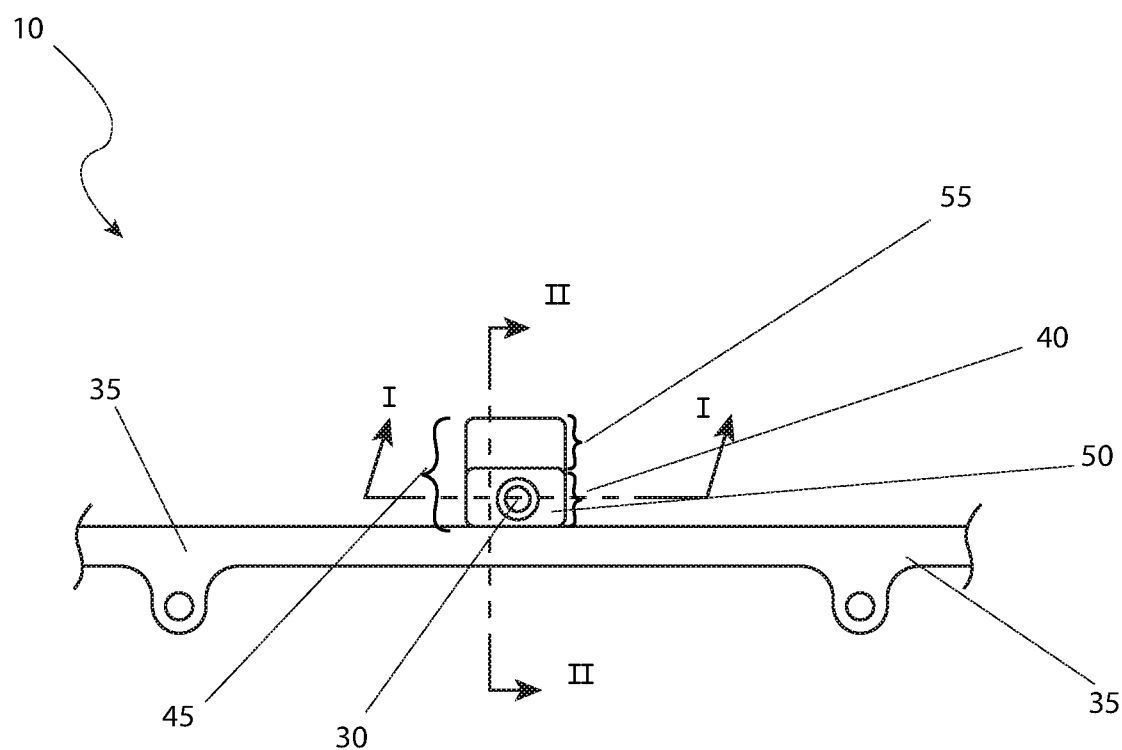
FIG. 2 is a front view of a retractable weather shield 10 installed on a rear-view camera mounted on a license plate trim ring 35.

Refer next to FIG. 2 for a front view of a retractable weather shield 10 that is mounted on a license plate trim ring 35. Such a placement is well-suited for aftermarket installation. This is in contrast to FIG. 1 which shows a retractable weather shield 10 that is part of a rear surface 20 of the motor vehicle 15 and thus is better-suited for OEM applications.

In any event the rear-view camera 30 is protected by a lower portion 40 of a weatherproof housing 45, of the retractable weather shielded 10. That weatherproof housing 45 further includes an upper portion 55 which houses internal electrical and mechanical components as are described below. The retractable weather shield 10 further includes a movable protective domed cover 50 which is selectively positioned either directly in front of closed position or above open position the view-port (lens system) of the rear-view camera 30.

When the rear-view camera 30 is not being used the domed cover 50 is moved downward to cover the lower portion 40 of the weatherproof housing 45, and thus is positioned directly in front of the rear-view camera 30 in a closed position. This protects the rear-view camera 30 and its view-port from dirt, mud, road grit, dust, salt, insects, snow, and other unwanted contaminants by having such contaminants deposited on the domed cover 50.

Figure 3:
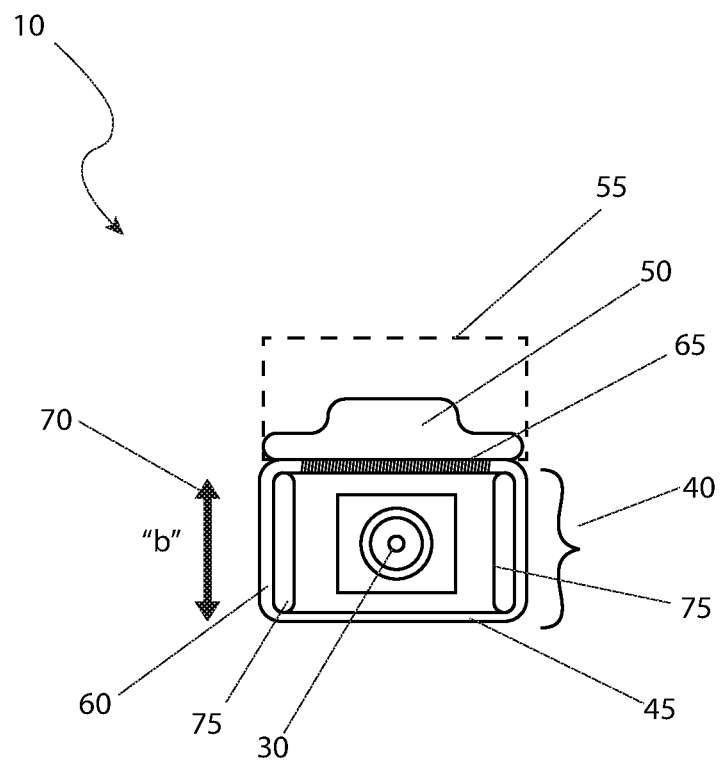
FIG. 3 is a sectional view of the retractable weather shield 10 taken along line I-I of FIG. 2.

Refer now to FIG. 3 for a sectional view of the retractable weather shield 10 taken along line I-I of FIG. 2. The domed cover 50 is opened by being flipped upward. This position would be taken when using the rear-view camera 30 such as when the motor vehicle 15 (FIG. 1) is backing up or parking. A weatherproof gasket 60 is provided around the perimeter of the lower portion 40 of the weatherproof housing 45. The weatherproof gasket 60 is envisioned to be rubber, silicone, or another suitable material which provides a weatherproof seal between the domed cover 50 and the lower portion 40 of the weatherproof housing 45.

Still referring to FIG. 3, a linear cleaning brush 65, shown at the top of a brush travel path "b" 70, enables cleaning of the rear-view camera 30 whenever the domed cover 50 is moved. The brush travel path "b" 70 is established by vertical guide tracks 75 disposed along the sides of the lower portion 40 of the weatherproof housing 45.

Figure 4:
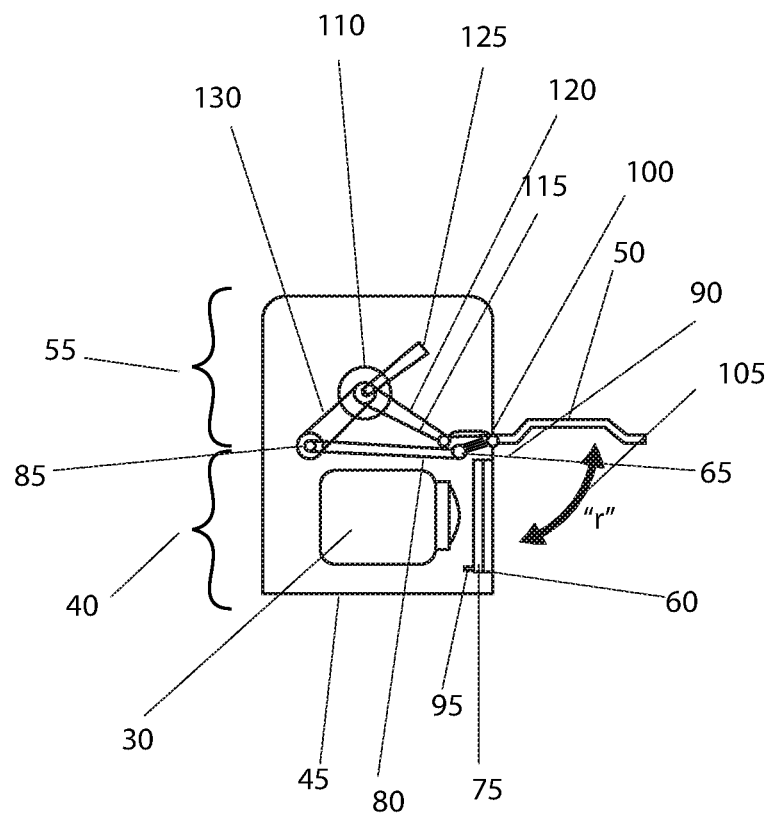
FIG. 4 is a sectional view of the retractable weather shield 10 taken along line II-II of FIG. 2; and, FIG. 5 is an electrical block diagram of the retractable weather shield 10.

Refer next to FIG. 4 for a sectional view taken along lines II-II of FIG. 2. FIG. 4 provides improved visual clarity on the electrical and mechanical components within the weatherproof housing 45. As noted, the rear-view camera 30 is located within the lower portion 40 of the weatherproof housing 45 and has a weatherproof gasket 60 located around its perimeter. Inside the weatherproof housing 45 is an electric motor 110 having integral limit switches. The electric motor 110 drives a hinge linkage mechanism 115 from a raised linkage position 120 (as shown) to a lowered linkage position 125 which positions the domed cover 50 in a closed state (as shown in FIG. 1 and FIG. 2).

The linkage mechanism 115 causes the cleaning brush 65 to travel along the guide tracks 75. That linkage mechanism 115 is driven by a cable 80 which is wound around a reel 85. The cable 80 moves the position of the cleaning brush 65 to an upper brush position 90 when the domed cover 50 is open. The cable 80 also moves the cleaning brush 65 to a lower brush position 95 when the domed cover 50 is closed.

The domed cover 50 pivots on a hinge point 100 as the domed cover 50 moves along rotational travel path "r" 105 when transitioning between the open position (when the rear-view camera 30 is being utilized) and the closed position (when the rear-view camera 30 is not being utilized, but is being protected from buildup of road grit, dust, salt, insects, snow, and any unwanted contaminants). A connecting drive belt 130 coupled between the electric motor 110 and the reel 85 simultaneously drives the cleaning brush 65, as described, when the domed cover 50 is being moved.

Figure 5:
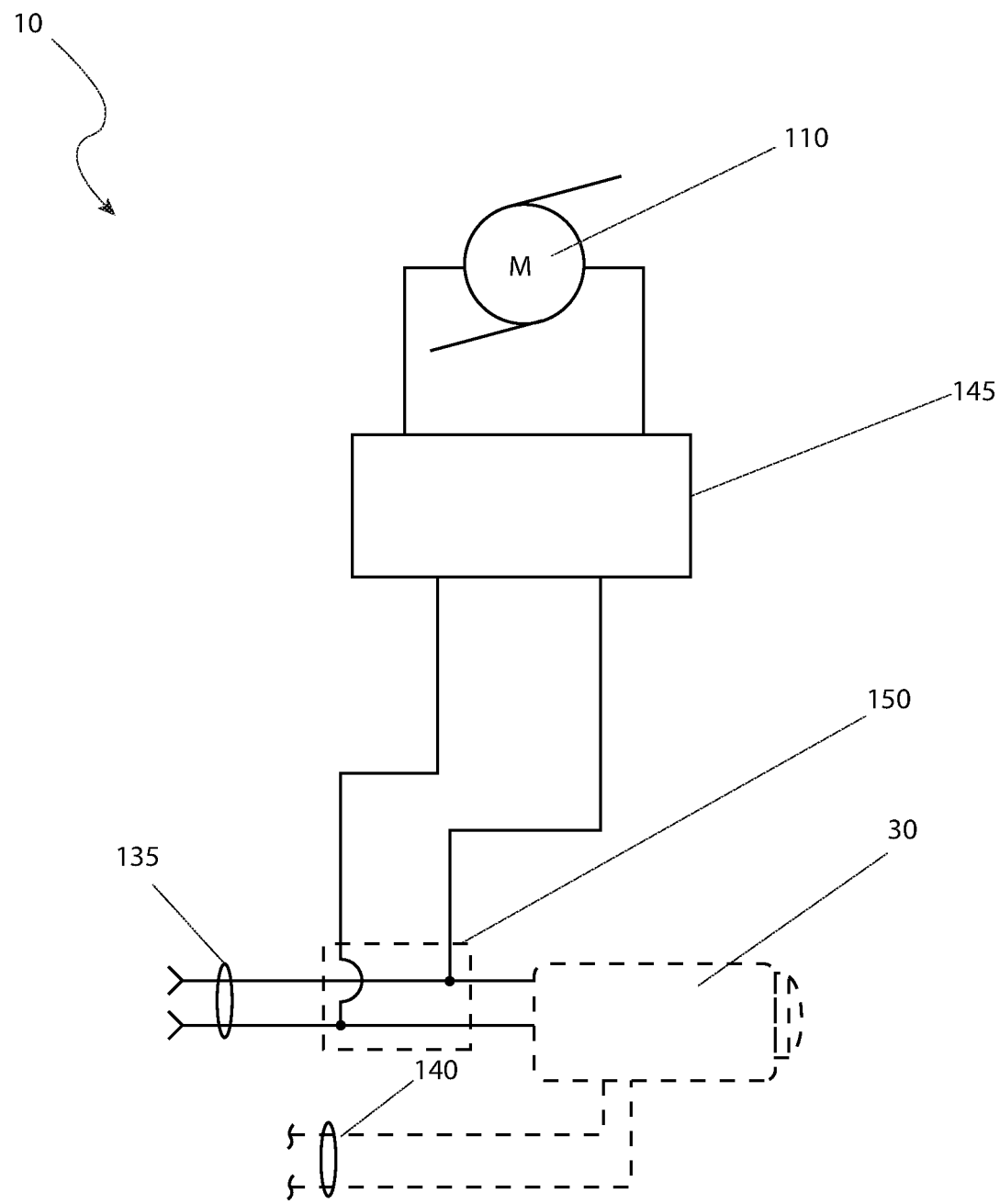

Refer finally to FIG. 5 for an electrical block diagram of the retractable weather shield 10. The rear-view camera 30 is connected to a 12 VDC supply 135 and to a camera video signal connection 140. It is envisioned that the 12 VDC supply 135 is energized whenever the rear-view camera 30 is powered on, such as when the motor vehicle 15 (FIG. 1) is in reverse. A motor control circuit 145 connects to the 12 VDC supply 135 via a splice point 150 either as part of the wiring harness or as part of an aftermarket add-on installation. The motor control circuit 145 conditions the electric motor 110 for operation as described above.

The preferred embodiment of the present invention can be utilized by the common user in a simple and effortless manner with little or no training. It is envisioned that the retractable weather shield 10 would be constructed in general accordance with FIG. 1 through FIG. 5. The user would procure the retractable weather shield 10 either as part of new vehicle purchase as OEM equipment or as an aftermarket add-on component for installation by the user or a skilled third party.

During installation the following process would be followed. The rear-view camera 30 would be positioned within the lower portion 40 of the weatherproof housing 45; the splice point 150 would be made in the 12 VDC supply 135 to connect the motor control circuit 145; and proper operation of the domed cover 50 would be verified.

During use the user or driver of the motor vehicle 15 would place the motor vehicle 15 in reverse; the energized 12 VDC supply 135 would drive the motor control circuit 145 and the electric motor 110 via power supplied by the splice point 150; the electric motor 110 would move the hinge linkage mechanism 115 into a raised linkage position 120, thus moving the domed cover 50 (FIG. 4) to an open position. Simultaneously, the connecting drive belt 130 is driven by the electric motor 110 to rotate the reel 85 and thus the cable 80; the cleaning brush 65 then travels along the guide tracks 75 as driven by the cable 80 to clean and wipe the rear-view camera 30; whereupon a video signal with no rearward obstructions is provided to existing on-board displays to aid in rearward vehicle guidance.

When the motor vehicle 15 is placed in a forward gear position the above process is reversed: the electric motor 110 is driven by the motor control circuit 145 to close the domed cover 50; simultaneously the connecting drive belt 130 is driven by the electric motor 110 to rotate the reel 85 and thus the cable 80; the cleaning brush 65 travels along the guide tracks 75 as driven by the cable 80 to clean and wipe the rear-view camera 30 and comes to rest at the upper brush position 90. It is also noted that the domed cover 50 may be raised manually by hand to clean the rear-view camera 30 such as when washing the motor vehicle 15 or when needed for various reasons.

The foregoing descriptions of an embodiment of the present invention were presented for purposes of illustration and description. They are not intended to be exhaustive or to limit the invention to the precise forms disclosed. Obviously, many modifications and variations are possible in light of the above teaching. The embodiment was chosen and described in order to best explain the principles of the invention and its practical application to thereby enable others skilled in the art to best utilize the invention and various embodiments with various modifications as are suited to the particular use contemplated.

The invention claimed is:

1. A camera protection device, comprising:
   a weatherproof housing having a lower portion for holding a camera and an upper portion;
   a movable protective domed cover;
   a mechanism for selectively moving said domed cover in front of the lower portion in a closed position or above the lower portion in an open position; and,
   a cleaning brush that vertically wipes across said lower portion when said mechanism moves said domed cover, wherein said mechanism includes a motor operatively connected to said domed cover.

2. The camera protection device according to claim 1, further includes a seal for sealing between said domed cover and said lower portion when said a domed portion is in front of said lower portion in a closed position.

3. The camera protection device according to claim 1, wherein said mechanism further includes a cable, a pivot for said domed cover, and a linkage connecting said motor to said domed cover.

4. The camera protection device according to claim 3, further includes a belt operatively connecting said motor to said linkage.

5. The camera protection device according to claim 4, wherein said mechanism is located inside said upper portion.

6. A camera, comprising:
   a weatherproof housing having a lower portion and an upper portion;
   a camera body in said lower portion;
   a movable protective domed cover;
   a mechanism for selectively moving said domed cover in front of the camera body or above the camera body; and,
   a cleaning brush that vertically wipes across said lower portion when said mechanism moves said domed cover, wherein said mechanism includes a motor operatively connected to said domed cover.

7. The camera protection device according to claim 6, further includes a seal for sealing between said domed cover and said lower portion when a domed portion is in front of the camera body in a closed position.

8. The camera according to claim 6, wherein said mechanism further includes a cable, a pivot for said domed cover, and a linkage connecting said motor to said domed cover.

9. The camera according to claim 8, further includes a belt operatively connecting said motor to said linkage.

10. A motor vehicle, comprising:
    a rear vehicle portion;
    a weatherproof housing disposed on said rear vehicle portion, said weather proof housing having a lower portion and an upper portion;
    a camera body in said lower portion;
    a movable protective domed cover;
    a mechanism for selectively moving said domed cover in front of the camera body or over the camera body; and,
    a cleaning brush that vertically wipes across said lower portion when said mechanism moves said domed cover, wherein said mechanism includes a motor operatively connected to said domed cover.

11. The motor vehicle protection device according to claim 10, further includes a seal for sealing between said domed cover and said lower portion when a domed portion is in front of the camera body in a closed position.

12. The motor vehicle according to claim 10, wherein said mechanism further includes a cable, a pivot for said domed cover, and a linkage connecting said motor to said domed cover.

13. The motor vehicle according to claim 12, further includes a belt operatively connecting said motor to said linkage.

14. The motor vehicle according to claim 13, wherein said mechanism is located inside said upper portion.

* * * * *